United States Patent
Gelle et al.

(10) Patent No.: US 12,045,490 B2
(45) Date of Patent: Jul. 23, 2024

(54) TRANSFERRING DATA TO BACKUP DATA REPOSITORIES

(71) Applicant: SAP SE, Walldorf (DE)

(72) Inventors: Sreenivasulu Gelle, San Ramon, CA (US); Alexander Ocher, San Jose, CA (US)

(73) Assignee: SAP SE, Walldorf (DE)

( * ) Notice: Subject to any disclaimer, the term of this patent is extended or adjusted under 35 U.S.C. 154(b) by 77 days.

(21) Appl. No.: 17/382,010

(22) Filed: Jul. 21, 2021

(65) Prior Publication Data

US 2023/0023084 A1  Jan. 26, 2023

(51) Int. Cl.
| | |
|---|---|
| *G06F 12/00* | (2006.01) |
| *G06F 3/06* | (2006.01) |
| *G06F 16/25* | (2019.01) |
| *G06F 21/60* | (2013.01) |

(52) U.S. Cl.
CPC .......... *G06F 3/0647* (2013.01); *G06F 3/0608* (2013.01); *G06F 3/0611* (2013.01); *G06F 3/067* (2013.01); *G06F 16/254* (2019.01); *G06F 21/602* (2013.01)

(58) Field of Classification Search
CPC .... G06F 3/0647; G06F 16/254; G06F 3/0608; G06F 3/0611; G06F 3/067; G06F 21/602
See application file for complete search history.

(56) References Cited

U.S. PATENT DOCUMENTS

| | | | | |
|---|---|---|---|---|
| 6,477,665 | B1 * | 11/2002 | Bowman-Amuah | ... G06F 11/22 714/39 |
| 9,053,109 | B1 * | 6/2015 | Joshi | ................. G06F 16/24532 |
| 9,329,881 | B2 * | 5/2016 | O'Donnell | .......... G06F 9/45533 |
| 9,779,015 | B1 * | 10/2017 | Oikarinen | ............... G06F 12/02 |
| 9,804,801 | B2 * | 10/2017 | Moon | .................... G06F 3/0656 |
| 9,830,111 | B1 * | 11/2017 | Patiejunas | ............. G06F 3/0625 |
| 10,365,827 | B1 * | 7/2019 | Satish | ................. G06F 12/1072 |
| 11,086,550 | B1 * | 8/2021 | Palanichamy | ........ G06F 16/256 |
| 11,269,911 | B1 * | 3/2022 | Jones | ...................... G06F 9/543 |
| 2002/0111949 | A1 * | 8/2002 | Barga | .................. G06F 11/1438 |
| 2004/0254948 | A1 * | 12/2004 | Yao | ........................ G06F 16/254 |

(Continued)

FOREIGN PATENT DOCUMENTS

WO   WO-2014068749 A1 *  5/2014  ....... G06F 17/30091

*Primary Examiner* — David Yi
*Assistant Examiner* — Tahilba O Puche
(74) *Attorney, Agent, or Firm* — Sterne, Kessler, Goldstein & Fox P.L.L.C.

(57) ABSTRACT

Disclosed herein are system, method, and computer program product embodiments for managing data storage devices. In some embodiments, a server receives a request to store data in a first storage device. The server determines the storage space remaining in the first data storage device based on historical data associated with the first data storage device. The server further determines that the first data storage device will exceed its storage capacity based on a size of the data and the storage space remaining in the first data storage device. The server transfers a set of data stored in the first data storage device to a second storage device. Transferring the set of data causes the storage space remaining in the first storage device to be greater than or equal to the size of the data. The server stores the data in the first data storage device.

20 Claims, 5 Drawing Sheets

(56) References Cited

U.S. PATENT DOCUMENTS

| | | | | |
|---|---|---|---|---|
| 2010/0083147 | A1* | 4/2010 | Gaffney | G06Q 30/02 |
| | | | | 715/762 |
| 2010/0332531 | A1* | 12/2010 | Galande | G06F 16/27 |
| | | | | 709/231 |
| 2012/0296883 | A1* | 11/2012 | Ganesh | G06F 16/185 |
| | | | | 707/693 |
| 2013/0332484 | A1* | 12/2013 | Gajic | G06F 16/285 |
| | | | | 707/E17.014 |
| 2014/0330793 | A1* | 11/2014 | Chamness | G06F 3/0641 |
| | | | | 707/692 |
| 2015/0269239 | A1* | 9/2015 | Swift | G06F 16/27 |
| | | | | 707/610 |
| 2016/0085682 | A1* | 3/2016 | Johnson | G06F 16/9574 |
| | | | | 707/692 |
| 2017/0116117 | A1* | 4/2017 | Rozen | G06F 12/0607 |
| 2017/0177649 | A1* | 6/2017 | Badrinarayanan | G06F 21/64 |
| 2017/0193012 | A1* | 7/2017 | Gupta | G06F 16/2379 |
| 2018/0150529 | A1* | 5/2018 | McPherson | G06F 9/542 |
| 2018/0181630 | A1* | 6/2018 | He | G06F 16/9024 |
| 2018/0357559 | A1* | 12/2018 | Truong | G06N 20/00 |
| 2020/0192572 | A1* | 6/2020 | Dwarampudi | G06F 3/064 |
| 2021/0109912 | A1* | 4/2021 | Biswas | G06F 21/602 |
| 2022/0398186 | A1* | 12/2022 | Mudumba | G06F 11/3684 |

\* cited by examiner

FIG. 5

TRANSFERRING DATA TO BACKUP DATA REPOSITORIES

BACKGROUND

Entities often are required to maintain their data for a prolonged amount of time, possibly indefinitely. The data is usually stored in files and/or in databases. However, storing this information on operational servers can easily exceed the available storage, slow down operations, and result in usage imbalances. Conventional systems may lack visibility regarding the amount of storage remaining in various data storage devices. Furthermore, conventional systems may attempt to store data in a data storage device with insufficient storage capacity. This may result in inadvertently overwriting data or being unable to complete the storage operation. Therefore, in this regard, conventional systems may be error-prone and operationally expensive.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for managing data storage devices.

As described above, corporations may be required to store and maintain data for long periods of time. However, conventional systems may lack visibility regarding a given data storage device's remaining storage capacity. As a result, when attempting to complete a storage request, the conventional systems may attempt to store data in the given storage device when the data storage device has exceeded its storage capacity. This may cause inadvertently overwriting data or being unable to complete the storage operation. Therefore, executing storage requests using conventional systems may be error-prone and operationally expensive.

Embodiments described herein solve these problems by keeping track of a respective data storage device's remaining storage capacity and proactively backing up data from the respective data storage device in response to determining that executing a storage request will cause the respective data storage device to exceed its storage capacity. In some embodiments, a server receives a request to store data in a first storage device. The server determines the storage space remaining in the first data storage device based on historical data associated with the first data storage device. The server further determines that the first data storage device will exceed its storage capacity based on a size of the data and the storage space remaining in the first data storage device. The server transfers a set of data stored in the first data storage device to a second storage device. Transferring the set of data causes the storage space remaining in the first storage device to be greater than or equal to the size of the data. The server stores the data in the first data storage device.

This embodiments described herein allow for determining that a respective data storage device will exceed its storage capacity before attempting to execute a storage request. By doing so, this configuration proactively backups a set of data from the respective data storage device. As a result, the described embodiments avoid unnecessary exceptions, inadvertently overwriting data, or being unable to execute the storage request.

Figure 1:
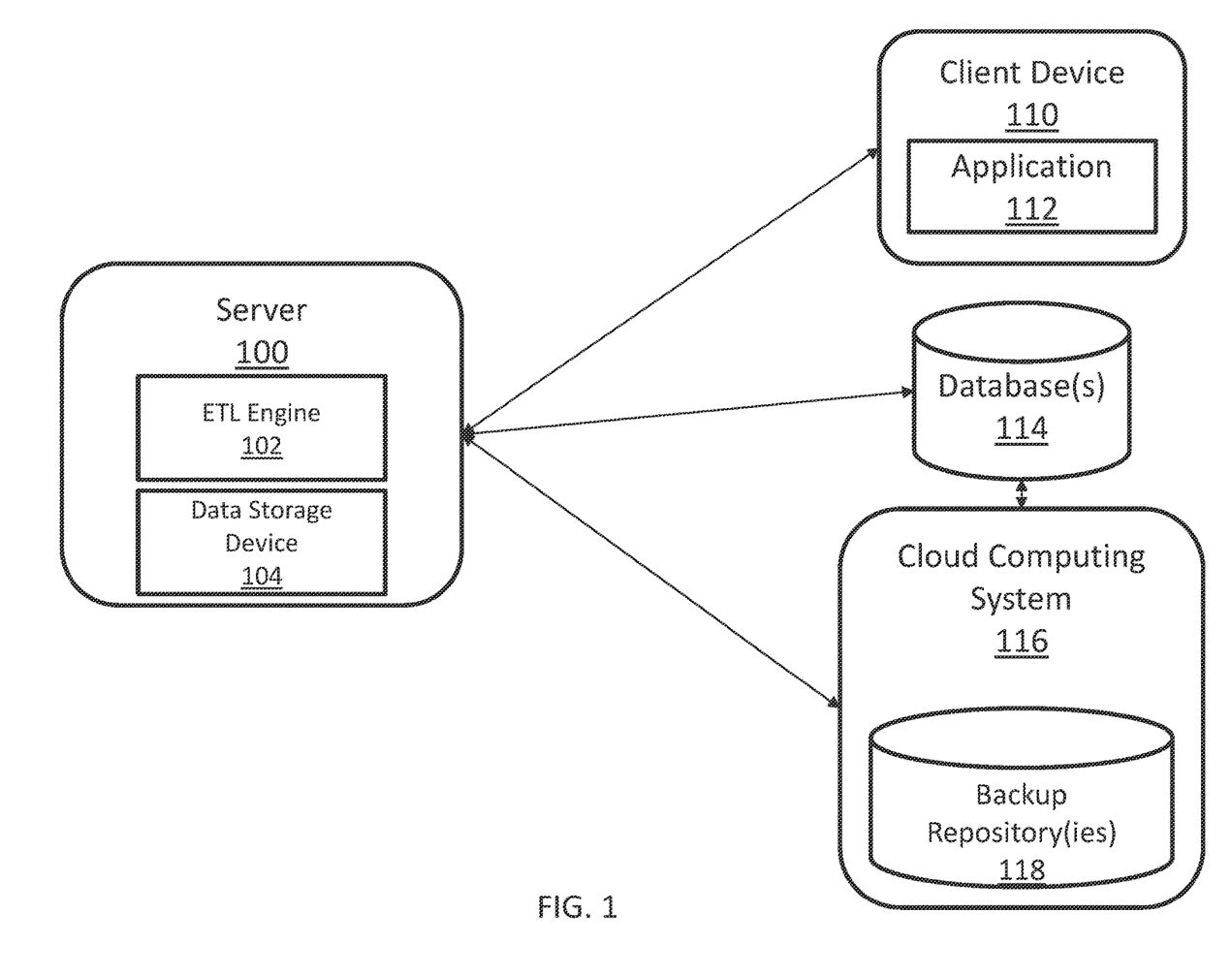
FIG. 1 is a block diagram of a system for managing data storage devices, according to some embodiments.

FIG. 1 is a block diagram of a system for managing data storage devices, according to some embodiments. In an embodiment, the architecture may include server 100, client device 110, database(s) 114, and a cloud computing system 116. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Server 100 may include an ETL engine 102. ETL engine 102 may be configured to perform extract, transform, load (ETL) operations with database 114. The ETL operations may include load, transfer, deletion, etc. Transform operations may include cleaning, deduplication, format revision, key restructuring, derivation, filtering, joining, splitting, data validation, summarization, aggregation, integration, etc.

Server 100 may also include a data storage device 104. Data storage device 104 may include information about database 114 and backup repository 118. The information may include a total storage capacity of database 114, previously executed ETL operations on database 114, policies and rules of backup repository 118. The policies and rules of backup repository 118 may include the subscription costs for storing data in backup repository.

Database 114 may be one or more databases configured to store structured or unstructured data. ETL engine 102 may receive requests to execute ETL operations from application 112 executing on client device 110. Alternatively, ETL engine 102 may be configured to execute ETL operations based on predefined rules automatically.

Cloud computing system 116 may include backup repository(ies) 118. Cloud computing system 116 may be affiliated with a third-party vendor. In this regard, the third-party vendor may provide storage services in backup repository 118 to an entity affiliated with server 100. For example, cloud computing system 116 may provide a subscription-based system for backup repository 118.

Backup repository 118 may be one or data repositories configured to store backup data previously stored in database 114. ETL engine 102 may be configured to execute ETL operations to transfer data from database 114 to backup repository 118. Furthermore, the backup data may be retrieved by server 100.

Figure 2:
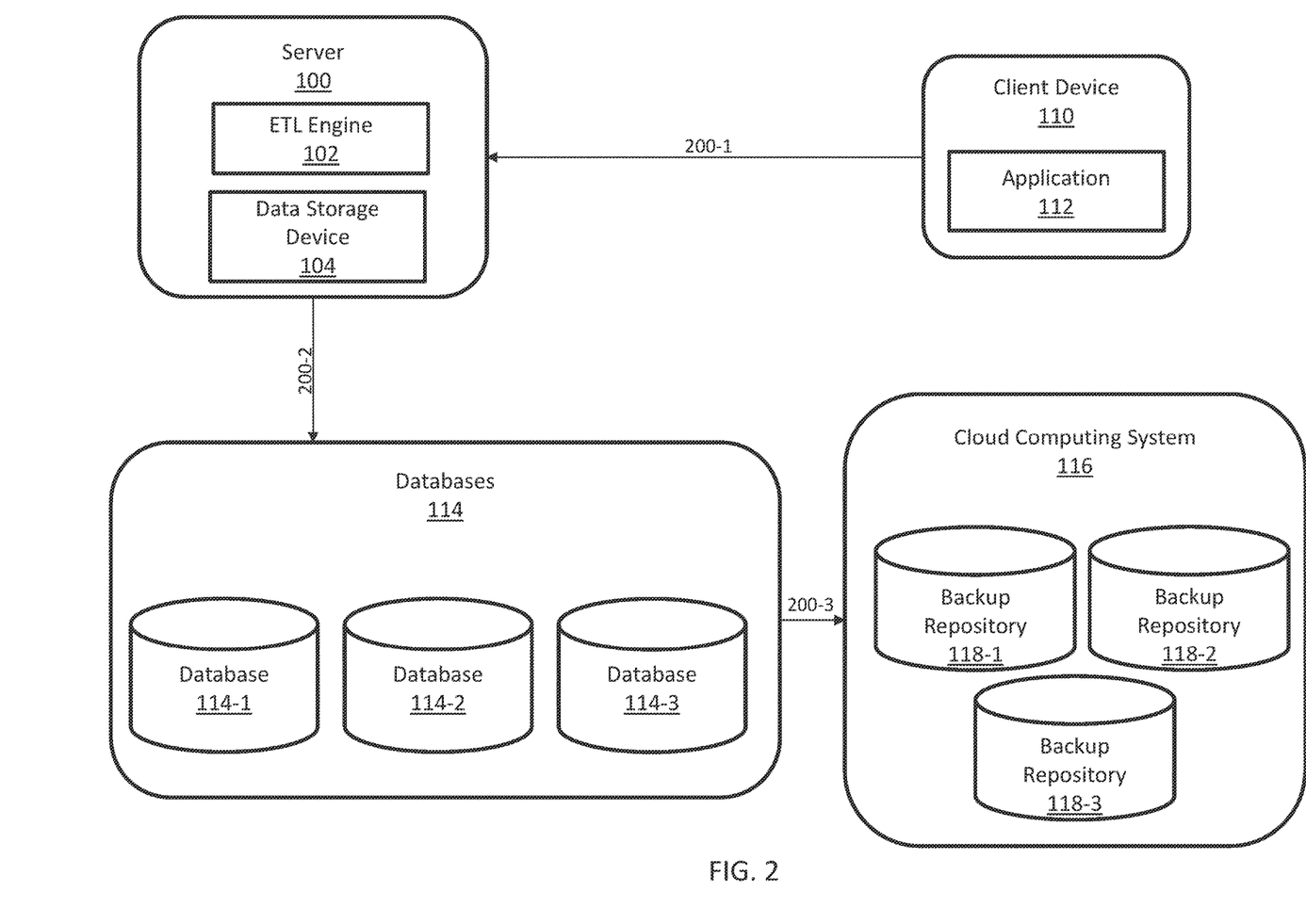
FIG. 2 is a block diagram illustrating an example data flow in the system for managing data storage devices, according to some embodiments.

FIG. 2 is a block diagram illustrating the data flow in the system for managing data storage devices, according to some embodiments. In a given embodiment, database 114 may include database 114-1, database 114-2, and database 114-3. Each of databases 114-1-114-3 may reside on separate servers. Alternatively, one or more of databases 114-1-114-3 may reside on a single server.

Cloud computing system 116 may include backup repositories 118-1-118-3. Each of backup repositories 118-1-118-3 may reside on the same cloud computing system 116. Alternatively, each of backup repositories 118-1-118-3 may reside on separate cloud computing systems 116. Additionally, one or more of backup repositories 118-1-118-3 may reside on the same cloud computing system 116, and one or more of the backup repositories 118-1-118-3 may reside on a different cloud computing system 116. Cloud computing system 116 may provide a single or different subscription models for backup repositories 118-1-118-3.

Application 112 may transmit request 200-1 to server 100 to store data in database 114-1, database 114-2, and database 114-2. For example, request 200-1 may include ETL operations (or jobs) to be executed. Request 200-1 may include the data to be stored in databases 114-1-114-3. The ETL operations may indicate the size of the data to be stored databases 114-1-114-3. The size may be in units to quantify data, such as kilobytes (KB), megabytes (MB), gigabytes (GB), terabytes (TB), etc. As a non-limiting example, request 200-1 may include the following ETL operations: (1) store 500 GB of data in database 114-1, (2) store 200 GB of data in database 114-2, and (3) 700 GB of data in database 114-3.

Server 100 may receive request 200-1. ETL engine 102 may determine the storage space remaining in databases 114-1-114-3 based on historical data associated with databases 114-1-114-3. For example, ETL engine 102 may keep track of all of the ETL operations (or jobs) corresponding to databases 114-1-114-3. The ETL operations may include store operations (e.g., loading data), transfer operations (e.g., backing up data), deletion operations (e.g., purging of data). As such, ETL engine 102 may track the amount of data loaded in each of databases 114-1-114-3 and the amount of data transferred out of each of databases 114-1-114-3.

ETL engine 102 may determine the storage capacity of databases 114-1-114-3. In some embodiments, ETL engine 102 may retrieve the storage capacities of databases 114-1-114-3 from data storage device 104. Alternatively, ETL engine 102 may transmit a request to databases 114-1-114-3 to determine the storage capacity of databases 114-1-114-3. As a non-limiting example, each of databases 114-1-114-3 may have a storage capacity of 1 TB.

ETL engine 102 may retrieve the ETL operations previously executed for databases 114-1-114-3. For example, ETL engine 102 may retrieve the ETL operations previously executed for databases 114-1-114-3 over a predetermined period of time from data storage device 104. As a non-limiting example, ETL engine 102 may retrieve the following previously executed ETL operations for database 114-1: (1) store operation for 400 GB of data, (2) store operation for 500 GB of data. (3) transfer operation of 100 GB of data, and (4) store operation of 100 GB of data. Furthermore, ETL engine 102 may retrieve the following previously executed ETL operations for database 114-2: (1) store operation for 500 GB of data and (2) store operation for 400 GB of data. Moreover. ETL engine 102 may retrieve the following previously executed ETL operations for database 114-3: (1) store operation for 400 GB of data, (2) store operation for 200 GB of data, and (3) store operation of 100 GB of data. As a result, ETL engine 102 may determine that database 114-1 has 100 GB of storage space remaining, database 114-2 has 100 GB of storage space remaining, and database 114-3 has 300 GB of storage space remaining.

ETL engine 102 may determine that databases 114-1-114-3 do not have enough storage space remaining to process the store operations in request 200-1. ETL engine 102 may determine that at least 400 GB of data needs to be transferred from database 114-1 to a backup repository to process the store operation. Furthermore, ETL engine 102 may determine that at least 100 GB of data needs to be transferred from database 114-2 to a backup repository to process the store operation. Moreover, ETL engine 102 may determine that at least 400 GB of data needs to be transferred from database 114-3 to a backup repository to process the store operation.

ETL engine 102 may identify 400 GB of data in database 114-1 to be transferred to a backup repository, 100 GB of data in database 114-2 to be transferred to a backup repository, 400 GB of data in database 114-3 to be transferred to a backup repository. Specifically, ETL engine 102 may identify data to be transferred to a backup repository based on a predetermined set of rules. For example, ETL engine 102 may identify data in database 114-1, database 114-2, and database 114-3 that is older than a predetermined time frame (e.g., older than 10 years). ETL engine 102 may use a timestamp corresponding to each data record to determine the age of the data. ETL engine 102 may also identify dependencies between the data to be transferred to a backup repository. For example, ETL engine 102 may identify rows 1-10 (e.g., a set of data) from database 114-1 to be transferred to a backup repository. However, ETL engine 102 may also determine that row 11 (e.g., a subset of data) includes data that depends on or is derived from row 10. As a result, ETL engine 102 may identify rows 1-11 to be transferred to the backup repository. To this end, ETL engine 102 may identify more than the necessary amount of data to be transferred to a backup repository. For example, ETL engine 102 may identify 450 GB of data from database 114-1 to be transferred to a backup repository, 125 GB of data from database 114-2 to be transferred to a backup repository, and 420 GB of data from database 114-3 to be transferred to a backup repository.

ETL engine 102 may also determine which backup repository to transfer the identified data. For example, each of backup repositories 118-1-118-3 may have different policies for storing data based on their storage capacity, vendor, or subscription policy. For example, backup repository 118-1 may limit how much data may be loaded over a given time period from a single entity. Additionally, backup repository 118-2 may charge fees for loading more than a threshold amount of data over a given time period. Furthermore, ETL engine 102 may identify a backup repository from backup repositories 118-1-118-3, which may be configured to store a particular data type. ETL engine 102 may also identify a backup repository from backup repositories 118-1-118-3, which has stores data from a particular database (e.g., databases 114-1-114-3). As a non-limiting example, ETL engine 102 may determine that 450 GB of the identified data from database 114-1 is to be transferred to backup repository 118-1, 125 GB of the identified data from database 114-2 is to be transferred to backup repository 118-2, and 420 GB of the identified data from database 114-3 is to be transferred to backup repository 118-3.

In some embodiments, ETL engine 102 may retrieve the policies of backup repositories 118-1-118-3. As indicated above, the policies may include the subscription policies of backup repositories 118-1-118-3. ETL engine 102 may identify the costs of storing the identified data in each of backup repositories 118-1-118-3 based on the subscription policies of backup repositories 118-1-118-3. Furthermore, ETL engine 102 may cause display of the costs associated with storing the identified data in backup repositories 118-1-118-3 on client device 110. A user may select one or more of backup repositories 118-1-118-3 for storing the identified data. Alternatively, ETL engine 102 may select one or more backup repositories 118-1-118-3 with the lowest subscription costs for storing the identified data.

ETL engine 102 may transmit request 200-2 to execute an extract and transform operation to extract and transform the identified data from databases 114-1-114-3. Specifically, ETL engine 102 may extract the identified data from databases 114-1-114-3 by executing an ETL extract operation. ETL engine 102 may identify data dependencies between the data to be extracted so that ETL engine 102 may extract the data in a particular order to maintain the data dependencies. Furthermore, ETL engine 102 may transform the extracted data to be loaded into a respective backup repository by executing one or more ETL transform operations. The extracted data may be transformed to be compatible and consistent with the corresponding backup repository.

ETL engine 102 may encrypt the extracted and transformed data. The encryption methodology may depend on which backup repository of backup repositories 118-1-118-3. ETL engine 102 may establish a connection with backup repositories 118-1-118-3. The connection may be an HTTP connection. ETL engine 102 may transmit request 200-3 using the established connection to backup repositories 118-1-118-3. Request 200-3 may include instructions to load the encrypted data into the respective backup repository. Specifically, request 200-3 may include instructions to load the encrypted data corresponding to database 114-1 in backup repository 118-1, load the data extracted from database 114-2 in backup repository 118-2, and load the data extracted from database 114-3 in backup repository 118-3.

In some embodiments, ETL engine 102 may combine the encrypted data corresponding to backup repository 118-1, backup repository 118-2, and backup repository 118-3 into a respective archive file and compress the archive file. Each archive file may be an encrypted data file. Request 200-3 may include instructions for loading the respective encrypted data file into the respective backup repository. ETL engine 102 may load an encrypted data file including data corresponding to database 114-1 in backup repository 118-1, load an encrypted data file including data corresponding to database 114-2 in backup repository 118-2, and load the data extracted from database 114-3 in backup repository 118-3 by executing ETL load operations.

In some embodiments, ETL engine 102 may decompress each respective encrypted data file. ETL engine 102 may also determine data dependencies between the data in the decompressed encrypted data. For example, the encrypted data, including data to be loaded into backup repository 118-1, may include rows 1-11. ETL engine 102 may determine that one or more data fields in each row after row 1 include one or more fields that include values generated based on the values in the preceding row. As such, ETL engine 102 may determine that the rows should be sequentially loaded into backup repository 118-1.

Once the data is loaded into the respective backup repository, ETL engine 102 may purge or delete the extracted data from databases 114-1-114-3 by executing ETL delete operations. ETL engine 102 may create aggregate records in database 114-1-114-3 for the extracted data and replace the records with a summary. ETL engine 102 may also delete a local copy of the archive file from database 114. Once the extracted data is deleted from databases 114-1-114-3, the remaining storage capacity of database 114 may be greater than or equal to the size of the data to be stored in databases 114-1-114-3, as indicated in request 200-1.

Once the data is purged from the database 114-1-114-3, ETL engine 102 may load the 500 GB of data in database 114-1, 200 GB of data in database 114-2, and 700 GB of data in database 114-3 received in request 200-1 by executing one or more ETL load operations.

In some embodiments, ETL engine 102 may execute a script to extract, transform, load, and delete data from databases 114-1-114-3 to backup repositories 118-1-118-3. The script may be an automated script configured to be executed in response to ETL engine 102 receiving a store request.

Figure 3:
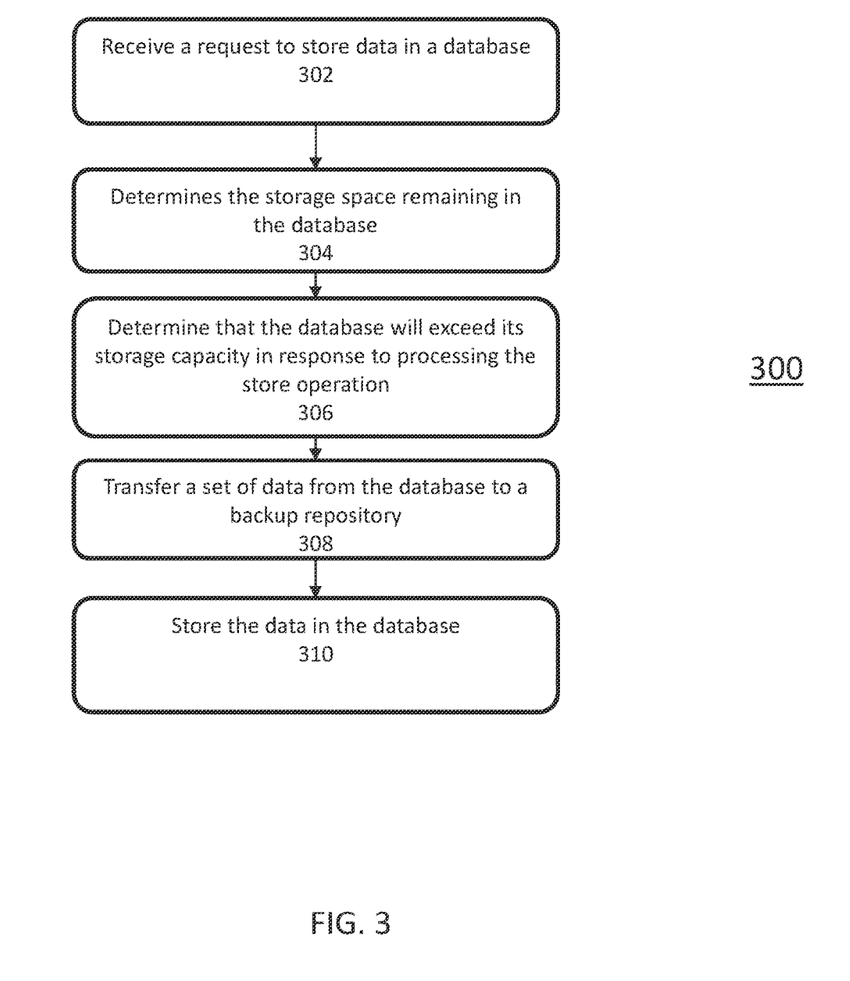
FIG. 3 is a flowchart illustrating a process for processing a store operation, according to some embodiments.

FIG. 3 is a flowchart illustrating a process for processing store requests, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 3, as will be understood by a person of ordinary skill in the art.

Method 300 shall be described with reference to FIG. 1. However, method 300 is not limited to that example embodiment.

In 302, server 100 receives a request to store data in database 114. The data may be a particular size. The request may include instructions for loading the data into database 114 by executing an ETL load operation.

In 304, ETL engine 102 determines the storage space remaining in database 114 based on historical data associated with the first storage device. For example, ETL engine 102 may retrieve the total storage capacity of database 114 from data storage device 104. Alternatively, ETL engine 102 may retrieve the total storage capacity of database 114 from the metadata of database 114. ETL engine 102 may also retrieve the previously executed ETL operations executed on database 114. The ETL operations may include extract, load, transfer, deletion, etc. ETL engine 102 may determine the storage space remaining in the first storage device based on the total storage capacity of database 114 and the previously executed ETL operations.

In 306, ETL engine 102 determines that database 114 will exceed its storage capacity in response to processing the store operation based on the particular size of the data and the storage space remaining in database 114. For example, the particular size of the data may be 300 GB, and the storage space remaining in database 114 may be 100 GB.

In 308, ETL engine 102 transfers a set of data from database 114 to a backup repository 118. Backup repository 118 may reside in cloud computing system 116 and may be affiliated with a third-party vendor. Continuing from the earlier example, ETL engine 102 may identify 200 GB of data (e.g., the set of data) from database 114 that can be transferred to backup repository 118 based on predetermined rules (or criteria). The predetermined rules may be associated with the age of the data, type of data, size of data, etc. Furthermore, ETL engine 102 may identify backup repository 118 based on the policies and rules of backup repository 118. For example, policies and rules may include storage limits, limitations regarding loading a predetermined amount of data at one time, the cost associated with loading the data, etc. ETL engine 102 may execute ETL extract and load operations to load the data into backup repository 118. ETL engine 102 may delete the set of data from database 114 once the transfer is complete. Once the set of data is deleted from database 114, the remaining storage capacity of database 114 may be greater than or equal to the size of the data to be stored in database 114.

In 310, ETL engine 102 stores the data in database 114 in response to transferring and deleting the data from database 114 to backup repository 118. ETL engine 102 may execute a load operation to load the data into database 114.

Figure 4:
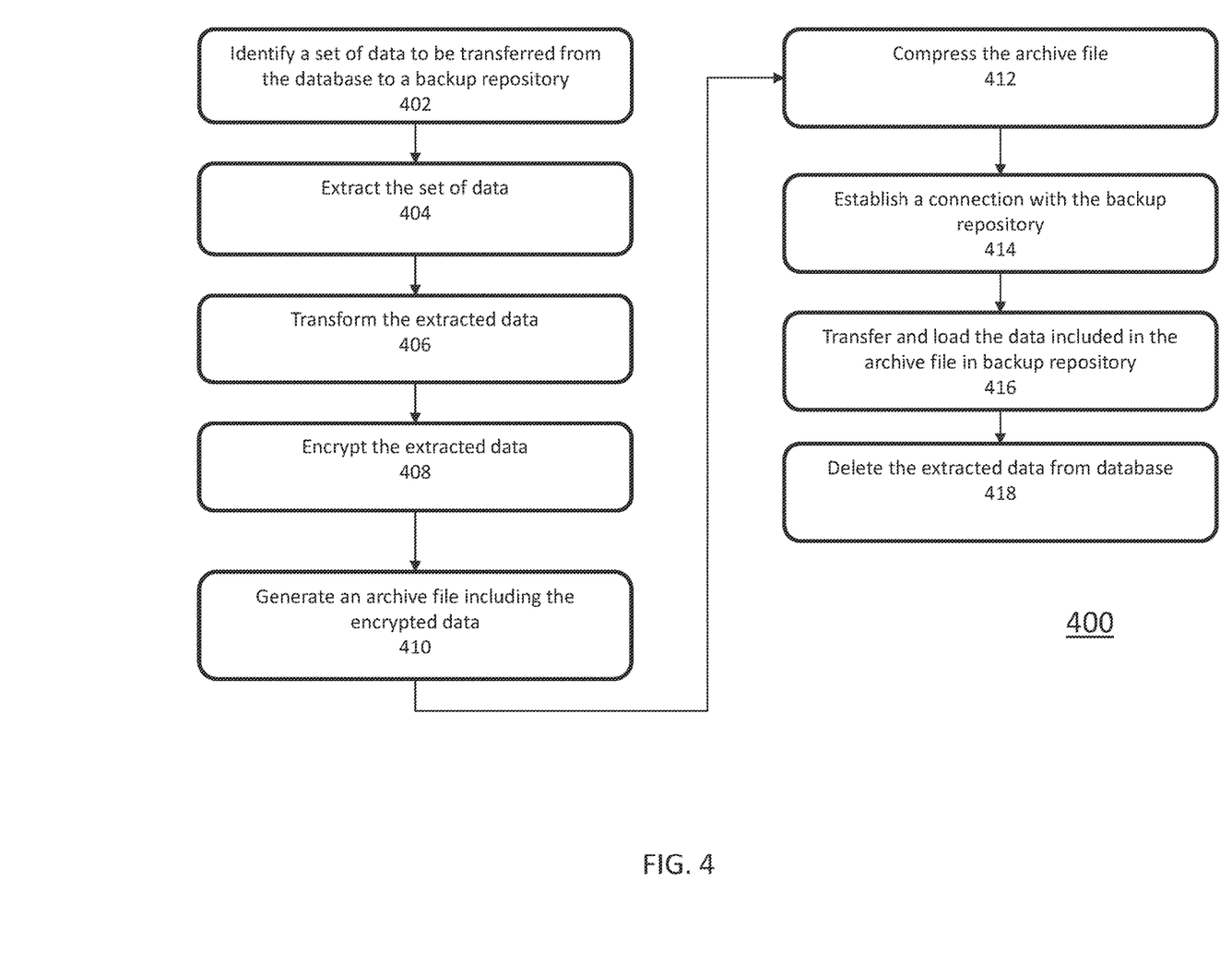
FIG. 4 is a flowchart illustrating using a process for transferring data from a database to a backup repository, according to some embodiments.

FIG. 4 is a flowchart illustrating using a metadata service to backing up data to a backup repository, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, ETL engine 102 identifies a set of data to be transferred from database 114 to backup repository 118. ETL engine 102 may identify the set of data to be transferred and backup repository 118, as indicated above in method 300 of FIG. 3.

In 404, ETL engine 102 extracts the set of data from database 114. ETL engine 102 may execute an ETL extract operation. ETL engine 102 may identify data dependencies between the data to be extracted so that ETL engine 102 may extract the data in a particular order to maintain the data dependencies.

In 406. ETL engine 102 transforms the extracted data by executing one or more ETL transform operations. ETL engine 102 may transform the extracted data such that it complies with the rules of backup repository 118 and is consistent with the other data stored in backup repository 118.

In 408, ETL engine 102 may encrypt the extracted data. The encryption format may correspond with database 114 or backup repository 118. For example, ETL engine 102 may use encryption formats that were previously used with data extracted from database 114 and/or encryption formats that are compatible with backup repository 118.

In 410, ETL engine 102 generates an archive file including the encrypted data. In some embodiments, ETL engine 102 may encrypt the archive file as well.

In 412, ETL engine 102 compresses the archive file. For example, ETL engine 102 may create a zip file using the archive file. Compressing the archive file may allow easier and faster transmission of the archive file.

In 414, ETL engine 102 establishes a connection with backup repository 118. The connection may be an HTML connection. The type of connection compatible with backup repository 118 may be defined within ETL engine 102.

In 416, ETL engine 102 transfers and loads the data included in the archive file in backup repository 118 using the established connection. In some embodiments, ETL engine 102 may decompress and unpack the archive file and load the unpacked data into the respective rows of backup repository 118. The data may remain encrypted while stored in backup repository 118.

In 418, ETL engine 102 deletes the extracted data from database 114. ETL engine may create aggregate records for the extracted data, replacing records in database 114 corresponding with the extracted data with their summary. The aggregate records may be used for reporting needs. ETL engine 102 may also delete a local copy of the archive file from database 114.

Figure 5:
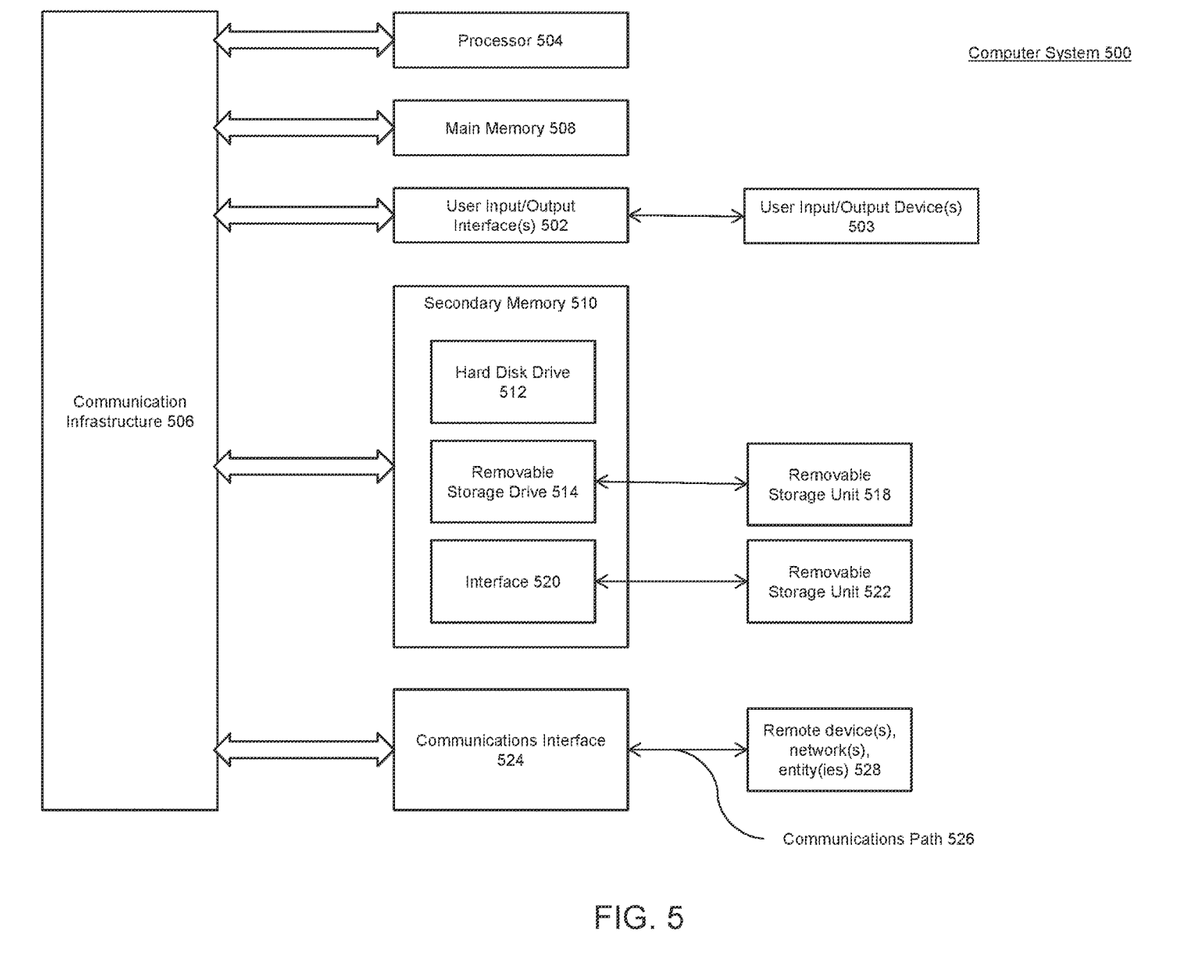
FIG. 5 is an example computer system useful for implementing various embodiments.

Various embodiments can be implemented, for example, using one or more computer systems, such as computer system 500 shown in FIG. 5. Computer system 500 can be used, for example, to implement methods 300 of FIG. 3, and 400 of FIG. 4. Furthermore, computer system 500 can be at least part of server 100, client device 110, databases 114, and cloud computing system 116, as shown in FIG. 1. For example, computer system 500 route communication to various applications. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 can include other means, instrumentalities, or other approaches for allowing computer programs and/or other instructions and/or data to be accessed by computer system 500. Such means, instrumentalities, or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A method for managing data storage, the method comprising:
   receiving, by a processor, a request to store data in a first database, wherein the request indicates both a plurality of databases to which to store the data including the first database and an amount of the data to be stored on each of the plurality of databases;
   determining, by the processor, storage space remaining in the first database based on historical data associated with the first database;
   determining, by the processor, that the first database will exceed its storage capacity in response to processing the request to store the data based on a size of the data and the storage space remaining in the first database;
   transferring, by the processor, a set of data comprising a subset of the plurality of rows stored in the first database to a backup repository, wherein transferring the set of data causes the storage space remaining in the first database to be greater than or equal to the size of the data;
   generating, by the processor, a summary of the set of data comprising the subset of rows transferred to the backup repository;
   replacing, by the processor, aggregate records in the first database corresponding to the set of data comprising the subset of rows transferred to the backup repository with the summary of the transferred subset of rows on the first database; and
   storing, by the processor, the data in the first database.

2. The method of claim 1, further comprising identifying, by the processor, the set of data based on one or more predetermined rules.

3. The method of claim 2, wherein at least one of the one or more predetermined rules is associated with a size of the set of data.

4. The method of claim 1, further comprising:
   determining, by the processor, that a first subset of data of the set of data is dependent on a second subset of data of the set of data; and transferring, by the processor, the second subset of data to the second storage device before the first subset of data in response to determining that the first subset of data is dependent on the second subset of data.

5. The method of claim 1, wherein the historical data includes previously executed extract, transform, and load (ETL) operations associated with a storage device.

6. The method of claim 5, further comprising storing the previously executed ETL operations associated with the storage device in the first database.

7. The method of claim 1, wherein transferring the set of data stored in the first database to the backup repository comprising:
compressing, by the processor, the set of data into a data file;
encrypting, by the processor, the data file;
deleting, by the processor, the set of data from the first database;
establishing, by the processor, a connection with the backup repository; and
transmitting, by the processor, the encrypted data file to the backup repository for storage.

8. The method of claim 1, further comprising identifying, by the processor, the backup repository based on predefined criteria associated with the backup repository and a type of the set of data.

9. A system for managing data storage, the system comprising:
a memory; and
a processor coupled to the memory, wherein the processor is configured to:
receive a request to store data in a first database, wherein the request indicates both a plurality of databases to which to store the data including the first database and an amount of the data to be stored on each of the plurality of databases;
determine storage space remaining in the first database based on historical data associated with the first database;
determine that the first database will exceed its storage capacity in response to processing the request to store the data based on a size of the data and the storage space remaining in the first database;
transfer a set of data comprising a subset of the plurality of rows stored in the first database to a backup repository, wherein transferring the set of data causes the storage space remaining in the first database to be greater than or equal to the size of the data;
generate a summary of the set of data comprising the subset of rows transferred to the backup repository;
replace aggregate records in the first database corresponding to the set of data comprising the subset of rows transferred to the backup repository with the summary of the transferred subset of rows on the first database; and
store the data in the first database.

10. The system of claim 9, wherein the processor is further configured to: identify the set of data based on one or more predetermined rules.

11. The system of claim 10 wherein at least one of the one or more predetermined rules is associated with a size of the set of data.

12. The system of claim 9, wherein the processor is further configured to:
determine that a first subset of data of the set of data is dependent on a second subset of data of the set of data; and
transfer the second subset of data to the second storage device before the first subset of data in response to determining that the first subset of data is dependent on the second subset of data.

13. The system of claim 9, wherein the historical data includes previously executed extract, transform, and load (ETL) operations associated with a storage device.

14. The system of claim 9, wherein transferring the set of data stored in the first database to the backup repository comprises:
compressing the set of data into a data file;
encrypting the data file;
deleting the set of data from the first database;
establishing a connection with the backup repository; and
transmitting the encrypted data file to the backup repository for storage.

15. The system of claim 9, further comprising identifying, by the processor, the backup repository based on predefined criteria associated with the backup repository and a type of the set of data.

16. A non-transitory computer-readable medium having instructions stored thereon that, when executed by at least one computing device, cause the at least one computing device to perform operations comprising, the operations comprising:
receiving a request to store data in a first database, wherein the request indicates both a plurality of databases to which to store the data including the first database and an amount of the data to be stored on each of the plurality of databases;
determining storage space remaining in the first database based on historical data associated with the first database;
determining that the first database will exceed its storage capacity in response to processing the request to store the data based on a size of the data and the storage space remaining in the first database;
transferring a set of data comprising a subset of the plurality of rows stored in the first database to a backup repository, wherein transferring the set of data causes the storage space remaining in the first database to be greater than or equal to the size of the data;
generating a summary of the set of data comprising the subset of rows transferred to the backup repository;
replacing aggregate records in the first database corresponding to the set of data comprising the subset of rows transferred to the backup repository with the summary of the transferred subset of rows on the first database; and
storing the data in the first database.

17. The non-transitory computer-readable medium of claim 16, wherein the operations further comprise:
determining that a first subset of data of the set of data is dependent on a second subset of data of the set of data; and
transferring the second subset of data to the second storage device before the first subset of data in response to determining that the first subset of data is dependent on the second subset of data.

18. The method of claim 1, further comprising:
identifying, by the processor, one or more additional rows comprising one or more dependencies in the data from the first database to be stored to a backup repository; and
adding, by the processor, the one or more additional rows to the data to be stored to the backup repository based on the one or more dependencies, wherein moving the data to the backup repository increases a space remaining on the first database beyond the amount of data to be storage on the first database beyond the amount that was indicated in the request.

19. The method of claim 1, wherein the summary comprises an aggregate of data records from the set of data.

20. The method of claim 1, wherein the transferring comprises:
   identifying a first cost associated with storing the set of data in the backup repository and a second cost associated with storing the set of data in a third database;
   displaying, on an interface, both the first cost and the second cost; and
   receiving, via the interface, a selection of the first cost associated with the backup repository.

* * * * *